June 11, 1968    C. W. WILLIAMS    3,387,901
PLASTIC BEARING RETAINER

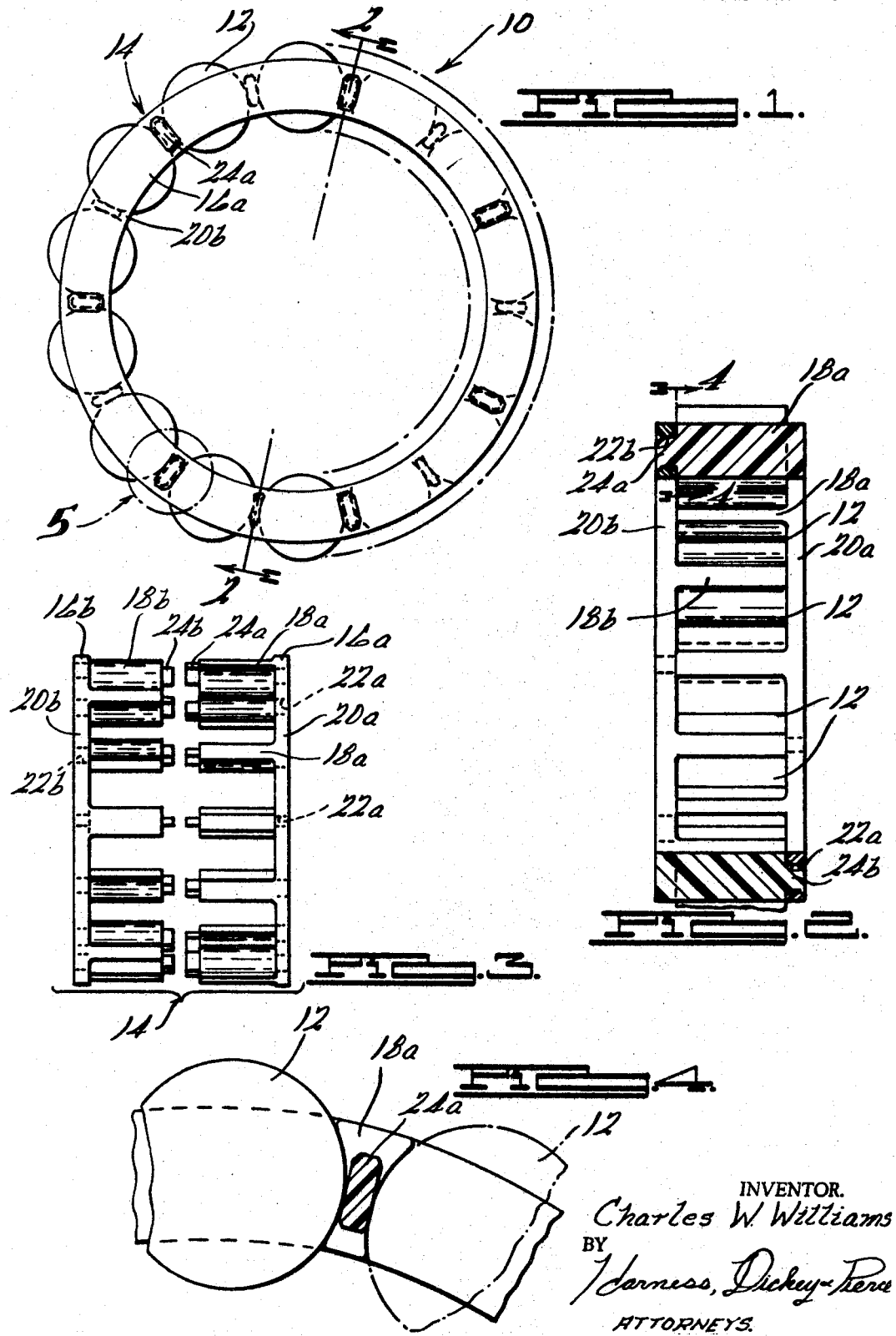

Filed Oct. 20, 1965    2 Sheets-Sheet 2

INVENTOR.
Charles W. Williams
BY Harness, Dickey & Pierce
ATTORNEYS.

3,387,901
PLASTIC BEARING RETAINER
Charles W. Williams, Birmingham, Mich., assignor to Federal-Mogul Corporation, Detroit, Mich., a corporation of Michigan
Filed Oct. 20, 1965, Ser. No. 498,721
1 Claim. (Cl. 308—217)

ABSTRACT OF THE DISCLOSURE

A plastic bearing retainer made from a moldable material having good lubricity characteristics and constructed from two pieces.

---

The present invention relates to bearing retainers.

In the past bearing retainers have been made of metal; with such a construction, if a small portion of the bearing retainer became broken away and intermingled with the other bearing parts the result would be destruction of the bearing. In the present invention the bearings can be made of a moldable plastic material in which the probability of bearings being destroyed under such conditions is reduced.

In the present invention a retainer construction is shown which can be made cheaper and which can be made from a material having good lubricity characteristics. In the present invention the retainer can be made by molding and to such close tolerances whereby any subsequent machining is obviated. Therefore, it is a general object of the present invention to provide a novel bearing retainer having an improved construction.

A further object of the present invention is to provide a bearing retainer made of a moldable plastic in which the molded parts need little or no machining after molding.

It is a further object of the present invention to provide a bearing retainer made of a moldable material having good lubricity characteristics to thereby enhance the operation of the bearing.

It is also another object of the present invention to provide a novel method for making retainers.

Other objects, features, and advantages of the present invention will become apparent from the subsequent description and the appended claims, taken in conjunction with the accompanying drawings, in which:

FIGURE 1 is a front elevational view of an assembly of a retainer and roller assembly;

FIGURE 2 is a sectional view of the assembly of FIGURE 1 taken substantially along the line 2—2;

FIGURE 3 is an exploded view to reduce scale of the bearing retainer shown in FIGURES 1 and 2;

FIGURE 4 is an enlarged sectional view of the portion of the assembly shown in FIGURE 2 taken substantially along the line 4—4;

Figure 5:
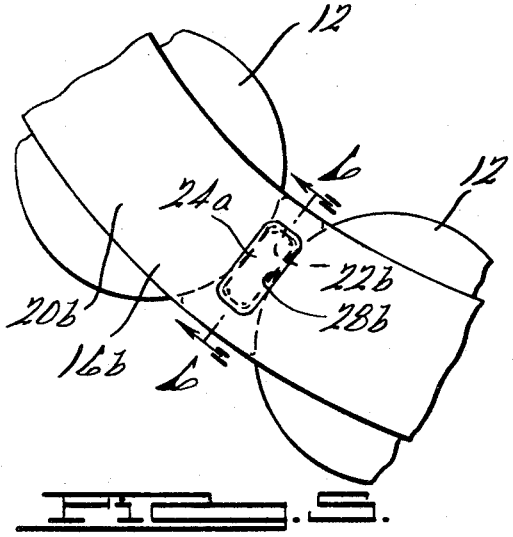
FIGURE 5 is an enlarged elevational view of the assembly of FIGURE 1 taken of that portion of the assembly generally indicated by the numeral 5 in FIGURE 1.

Looking now to the drawings, in FIGURE 1 a roller and retainer assembly is shown and generally indicated by the numeral 10 and includes a plurality of straight rollers 12 and a retainer member 14. The retainer member 14 is made of a moldable plastic material and, as shown in FIGURE 3, is molded in two identical halves 16a and 16b which are complementary with each other. The retainer half 16a is formed with a plurality of alternate ribs 18a which extend axially from a flange portion 20a. Between each pair of ribs 18a is located an aperture 22a. The retainer 16b, being formed identically, is likewise provided with a plurality of axially extending ribs 18b and alternate apertures 22b and a flange portion 20b. The ribs 18a and 18b terminate in reduced section portions or tabs 24a and 24b, respectively, which are of the size to matably fit within the apertures 22b and 22a, respectively. Thus, by merely indexing the retainer halves 16a, 16b, whereby the tabs 24a and 24b can be located within the apertures 22b and 22a, respectively, the two retaining halves 16a and 16b can be assembled to form the retainer 14 (see FIGURES 1 and 2). In the preferred form the tabs 24a and 24b are locatable within slots 22b and 22a, respectively, with an interference fit. The material of the retainer 14 being of a moldable material, the ends of the tabs 24a and 24b can then be welded over or otherwise deformed to securely fasten the two retainer halves 16a and 16b together. With some forms of moldable plastic material ultrasonic welding can be employed to perform this latter operation. Ultrasonic welding has been found to be particularly advantageous since not only is a head formed but there is also an actual bonding of the material, similar to conventional welding of metals, whereby a strong connection is made. Since the retainer 14 is made of a moldable material, the desired shape can be formed without the requirement for subsequent machining. Thus the ribs 18a and 18b can be formed with circular bearing surfaces to match the contour of the rollers 12 (FIGURE 4). Also, the ribs 18a and 18b can be made to have a thin section, especially at the roll circle of the rollers 12, whereby the maximum number of rollers 12 could be provided in the assembly, such as assembly 10. In fact, the section at the roll circle could be made thin enough whereby substantially a full complement of rollers 12 could be used; the greater the number of rollers 12 provided, the greater will be the capacity of the bearing in which retainer assembly 10 will be utilized. One form of material found suitable is a mixture of nylon, glass fiber (30%) and molydisulfide (5%).

Figure 6:
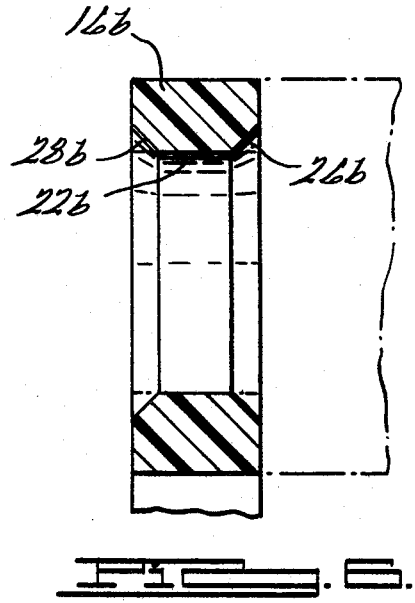
FIGURE 6 is an enlarged sectional view of FIGURE 5 taken substantially along the line 6—6.

Looking now to FIGURES 5 and 6, in order to facilitate assembly of the retainer halves 16a and 16b, the apertures 22b (and hence apertures 22a) are provided on opposite sides with beveled openings such as 26b and 28b. The bevel 26b on the inside will facilitate guiding the tab 24a into the aperture 22b while the bevel 28b on the outside will provide space for the deformation of the tab 24a into an enlarged head whereby the two retainer halves 16a and 16b are held tightly together. Note that in order to provide for maximum tab and head size, the apertures 22a and 22b and hence the mating tabs 24a and 24b are elongated radially along the radial width of their associated ribs 18a and 18b.

Figure 7:
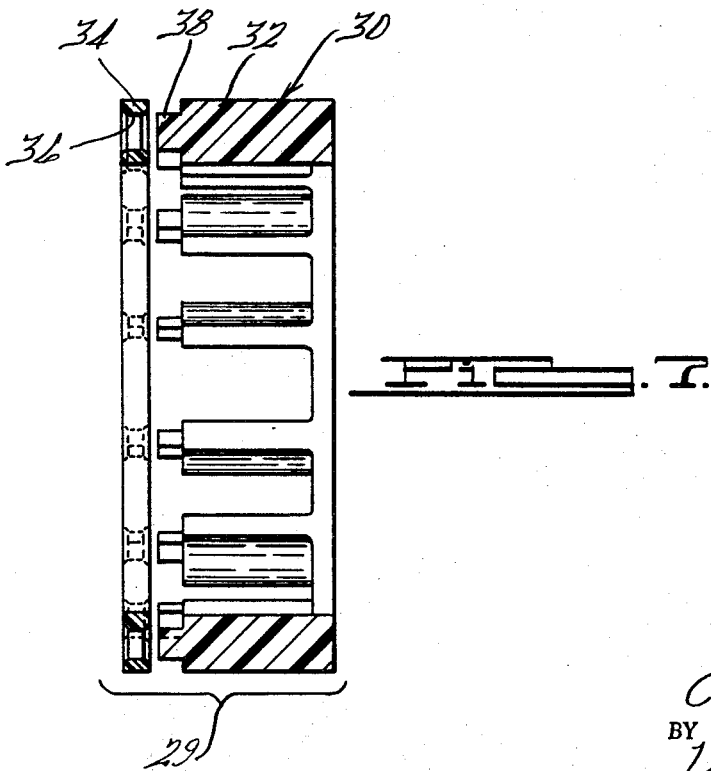
FIGURE 7 is an exploded side elevational, sectional view of a modified bearing retainer.

FIGURE 7 depicts a modified construction in which the retainer 29 is made of two dissimilar parts. These parts include a rib segment 30 having a plurality of ribs 32 which correspond in shape to the ribs 18a, 18b, with the difference being, however, that all of the ribs of the retainer 29 are located on rib segment 30. The second part is flat ring member 34 which contains a plurality of apertures 36 which are similar to the apertures 22a and 22b; however, the ring 34 contains all of the apertures of the retainer 29 and receive the tabs 38 of the ribs 32 from the rib segment 30. The method of securing the ribbed segment 30 and the ring member 34 together would be in a manner similar to that previously described in the discussion of the embodiment in FIGURES 1–6; i.e., forming a head at the end of the tab 38 after the segment 30 has been assembled to the ring 34. It is also contemplated that the bearing retainers previously shown and described could be made of sintered metal which also lends itself to molding methods; lubricity could be provided by oil impregnating the sintered metal.

While it will be apparent that the preferred embodiment of the invention disclosed is well calculated to fulfill the objects above stated, it will be appreciated that the invention is susceptible to modification, variation and change without departing from the proper scope of fair meaning of the subjoined claim.

What is claimed is:

1. A bearing retainer for retaining antifriction members comprising: a first one piece annular member being molded from a plastic moldable material having good lubricity characteristics and having a plurality of axially extending ribs having a surface for engaging the antifriction members of a contour similar to that of the antifriction members, said ribs terminating in reduced section, radially elongated tabs, a second one piece annular member being molded from a plastic moldable material having good lubricity characteristics and having a pluraity of openings for receiving saids tabs, said openings being elongated radially similarly to said tabs and being formed to provide an interference fit therewith, said openings being tapered outwardly at both axial ends with said tabs terminating in those tapers at the axially outer end of said second member with the ends of said tabs being deformed to fill the cavities defined by said those tapers whereby heads are formed to secure said first and second members together, each of said ribs defining one side of pockets for receiving the antifriction members with said surface extending substantially for the width of said pockets, said first and second member having the thickness in the area of said openings generally the same as the thickness in the area between said ribs.

References Cited

UNITED STATES PATENTS

| | | | |
|---|---|---|---|
| 2,883,245 | 4/1959 | Anderson | 308—217 |
| 3,172,710 | 3/1965 | Altson | 208—217 |
| 3,224,915 | 12/1965 | Balamuth et al. | 29—470.1 |

FOREIGN PATENTS

| | | |
|---|---|---|
| 433,767 | 5/1948 | Italy. |

MARTIN P. SCHWADRON, *Primary Examiner.*

F. SUSKO, *Assistant Examiner.*